(12) United States Patent
Liu et al.

(10) Patent No.: US 10,642,134 B2
(45) Date of Patent: May 5, 2020

(54) ADJUSTING STRUCTURE OF REFLECTOR AND PROJECTING APPARATUS

(71) Applicant: Coretronic Corporation, Hsin-Chu (TW)

(72) Inventors: Ming-Chen Liu, Hsin-Chu (TW); Tsan-Fu Tseng, Hsin-Chu (TW); Liang-Wei Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/392,564

(22) Filed: Apr. 23, 2019

(65) Prior Publication Data
US 2019/0361326 A1  Nov. 28, 2019

(30) Foreign Application Priority Data

May 22, 2018 (CN) .......................... 2018 1 0492991
Dec. 21, 2018 (CN) ..................... 2018 2 2155627 U (51) Int. Cl.
*G03B 21/14* (2006.01)
*G02B 7/02* (2006.01)
*G02B 27/09* (2006.01)

(52) U.S. Cl.
CPC .......... *G03B 21/142* (2013.01); *G02B 7/022* (2013.01); *G02B 27/0977* (2013.01); *G03B 21/145* (2013.01)

(58) Field of Classification Search
CPC .... G03B 21/28; G03B 21/142; G03B 21/145; G03B 21/2053; H04N 9/317; H04N 9/3141; H04N 9/3158
See application file for complete search history.

(56) References Cited

U.S. PATENT DOCUMENTS

| | | | | |
|---|---|---|---|---|
| 7,686,458 B2* | 3/2010 | Aizawa | .................. | G02B 7/181 353/77 |
| 2010/0214539 A1* | 8/2010 | Cheng | .................... | G03B 21/28 353/98 |

FOREIGN PATENT DOCUMENTS

| | | |
|---|---|---|
| CN | 103186017 | 7/2013 |
| CN | 105372911 | 3/2016 |
| TW | 452093 | 8/2001 |

* cited by examiner

*Primary Examiner* — Sultan Chowdhury
(74) *Attorney, Agent, or Firm* — JCIPRNET (57) ABSTRACT

An adjusting structure of reflector includes a base, a pivoting component, a reflector, a first adjusting screw and a second adjusting screw. The pivoting component is connected to the base, and the base is pivoted to a housing by using the pivoting component, and has freedoms of motion rotating around a first axial direction and a second axial direction perpendicular to the first axial direction. The reflector is disposed on the base. The first adjusting screw and the second adjusting screw are configured to be penetrated the housing and connected to the base. An adjusting direction of the first adjusting screw and the first axial direction may intersect with each other. The first adjusting screw and the second adjusting screw are located at the same side of the base. A projecting apparatus comprising the above adjusting structure of reflector is also provided.

22 Claims, 6 Drawing Sheets

ADJUSTING STRUCTURE OF REFLECTOR AND PROJECTING APPARATUS

CROSS-REFERENCE TO RELATED APPLICATION

This application claims the priority benefits of China applications serial no. 201810492991.8 filed on May 22, 2018 and 201822155627.0 filed on Dec. 21, 2018. The entireties of the above-mentioned patent applications are hereby incorporated by reference herein and made a part of this specification.

BACKGROUND OF THE INVENTION

1. Field of the Invention

The invention relates to an adjusting structure of reflector and a projecting apparatus using the adjusting structure of reflector.

2. Description of Related Art

An existing projecting apparatus generally includes a light source module, an optical component group, an imaging module and a projection lens module. The optical component group is disposed between the light source module and the imaging module, and the imaging module is disposed between the optical component group and the projection lens module. Firstly, an illuminating beam emitted by the light source module may pass through the optical component group, so that actions such as light filtering, light composition, light splitting and adjustment of a transmission path are performed. Then, the illuminating beam passes through the optical component group and is projected to the imaging module, so as to be modulated into an image beam. Finally, the image beam is projected to the projection lens module, and the projection lens module is configured to receive and amplify the projected image beam to the outside.

Generally speaking, most of optical component groups are provided with reflectors configured to adjust the angle or position of an illuminating beam toward the imaging module. A common reflector is fixed on a housing of the projecting apparatus by screws. When a user wants to adjust the position of the reflector. Firstly, the screws need to be completely removed, and after the reflector is adjusted to a fixed position, the screws are threaded into the housing to hold the reflector, so as to maintain the relative position between the housing and the reflector. From the above content, an adjusting structure of the existing reflector is relatively complicated and time-consuming in operation, and is less likely to ensure the stability and accuracy during adjustment of the reflector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The present invention provides an adjusting structure of reflector. The adjusting structure of reflector is simple and time-saving in operation, and can achieve good adjusting stability and accuracy.

The invention provides a projecting apparatus, including the adjusting structure of reflector.

In order to achieve one, some or all of the aforementioned objectives or other objectives, one embodiment of the present embodiment provides an adjusting structure of reflector, including a base, a pivoting component, a reflector, a first adjusting screw and a second adjusting screw. The pivoting component is connected to the base. The base is pivoted to a housing by using the pivoting component and has freedoms of motion rotating around a first axial direction and around a second axial direction perpendicular to the first axial direction. The reflector is disposed on the base. The first adjusting screw and the second adjusting screw are penetrated into the housing and connected to the bases. The adjusting direction of the first adjusting screw and the first axial direction may intersect with each other. The first adjusting screw and the second adjusting screw are located at the same side of the base.

In order to achieve one, some, or all of the aforementioned objectives or other objectives, one embodiment of the present embodiment provides a projecting apparatus, including a housing, a light source module, an adjusting structure of reflector, an imaging module and a projection lens module. The light source module is disposed on the housing, and is configured to emit an illuminating beam. The adjusting structure of reflector is disposed on the housing, and includes a base, a pivoting component, a reflector, a first adjusting screw and a second adjusting screw. The pivoting component is connected to the base, wherein the base is pivoted to the housing by using the pivoting component, and has freedoms of motion rotating around a first axial direction and a second axial direction perpendicular to the first axial direction. The reflector is disposed on the base, is located on a transmission path of the illuminating beam, and is configured to deflect the illuminating beam. The first adjusting screw and the second adjusting screw are penetrated into the housing and connected to the bases. The adjusting direction of the first adjusting screw and the first axial direction may intersect with each other. The first adjusting screw and the second adjusting screw are located at the same side of the base. The imaging module is disposed on the housing, and is configured to modulate the illuminating beam reflected by the reflector into an image beam. The projection lens module is disposed on the housing, and is configured to receive and project the image beam.

Based on the above, the embodiments of the present invention have at least one of the following advantages or effects. In the embodiments of the present invention, the base is limited in the housing by the two adjusting screws. By rotatably adjusting either of the two adjusting screws, the base and the reflector on the base can be driven, so that the base and the reflector on the base may be rotated relative to the housing with respect to a rotating supporting point (namely, the pivoting component) around two different axes. With the adjustment of a position of the reflector, the illuminating beam deflected by the reflector to the imaging module may be changed in angle or position accordingly. In the process of adjusting the position of the reflector, the two adjusting screws do not need to be removed. Once the adjustment of the two rotatable adjusting screws is stopped, the positions of the base and the reflector on the base are also fixed accordingly. On the other hand, at least one elastic component and the two adjusting screws are disposed at the same side of the base, and the least one elastic component is configured to abut against the housing, thus improving the stability of the base and the reflector on the base relative with respect to the housing during the process of rotation. As a result, the rotation process of the base and the reflector on the base relative to the housing may also be more smoothly to be rotated. It is worth mentioning that the least one elastic component may include two elastic parts. In other words, the two elastic parts can be integrally formed into a single elastic component. In general, the coordination of the two adjusting screws and the elastic component not only can cause the adjustment process of the positions of the base and the reflector on the base to be more simple and more time-saving, but also can achieve good adjustment stability and accuracy.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
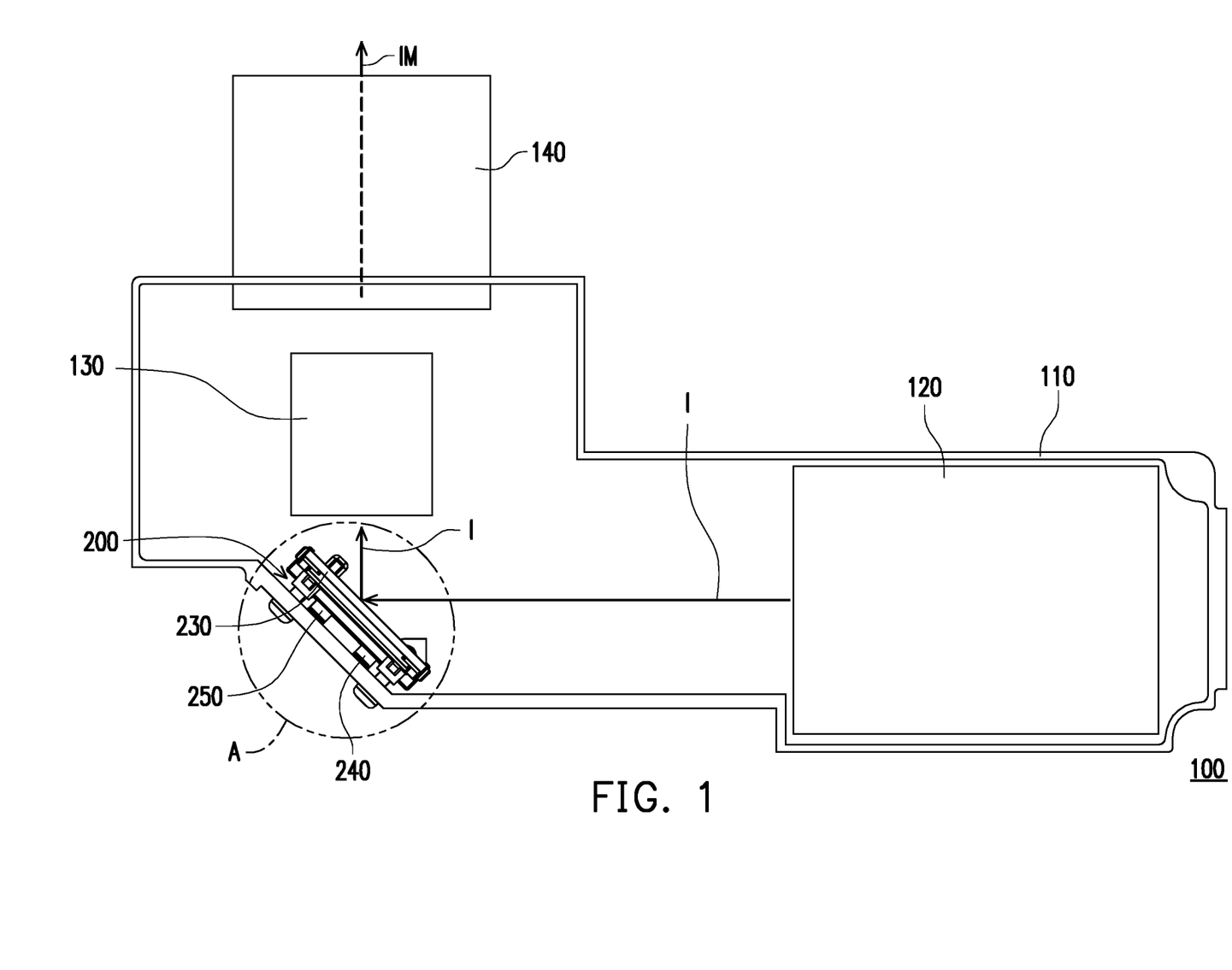
FIG. 1 is a top view schematic diagram of a projecting apparatus of one embodiment of the present invention.
Figure 2:
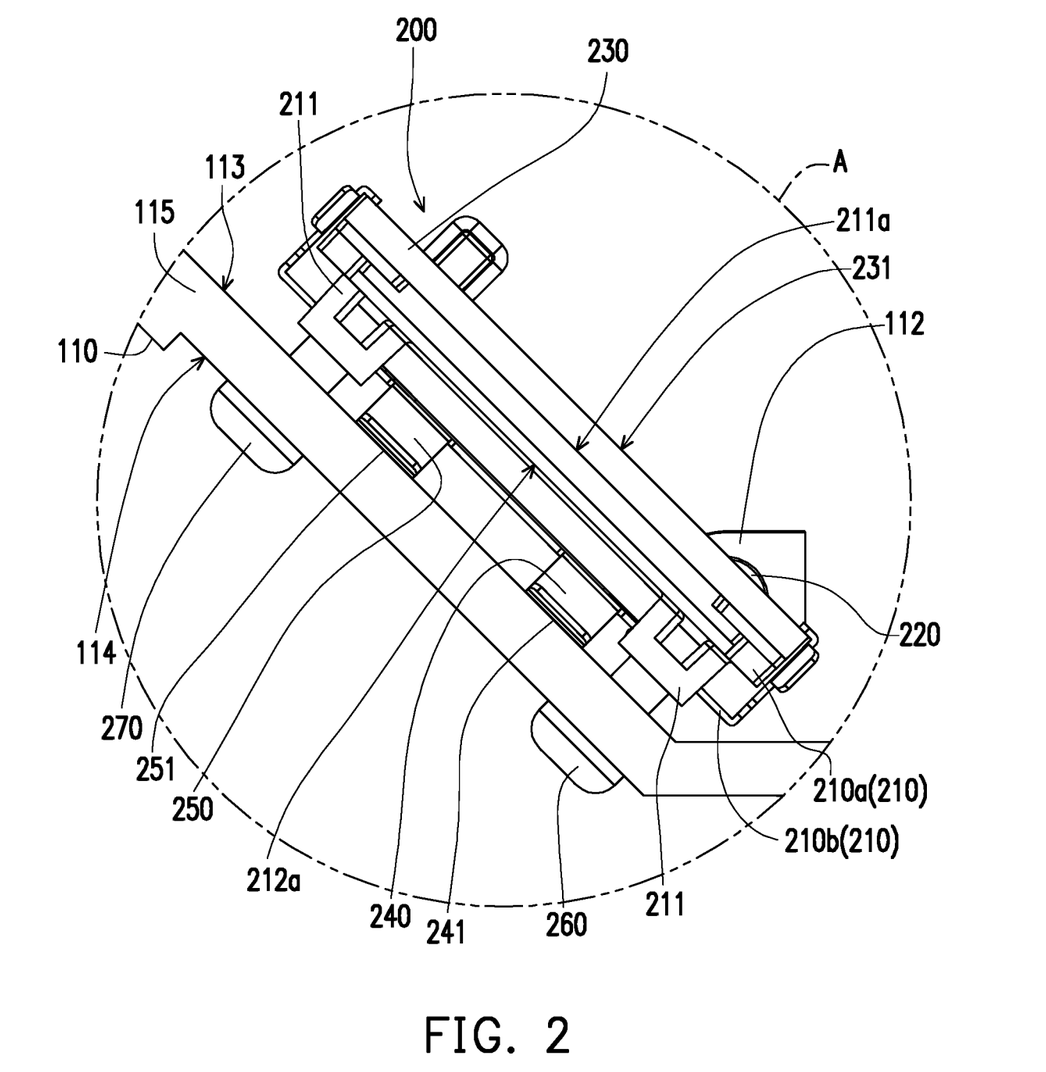
FIG. 2 is a partially enlarged schematic diagram of an area A of FIG. 1.
Figure 3:
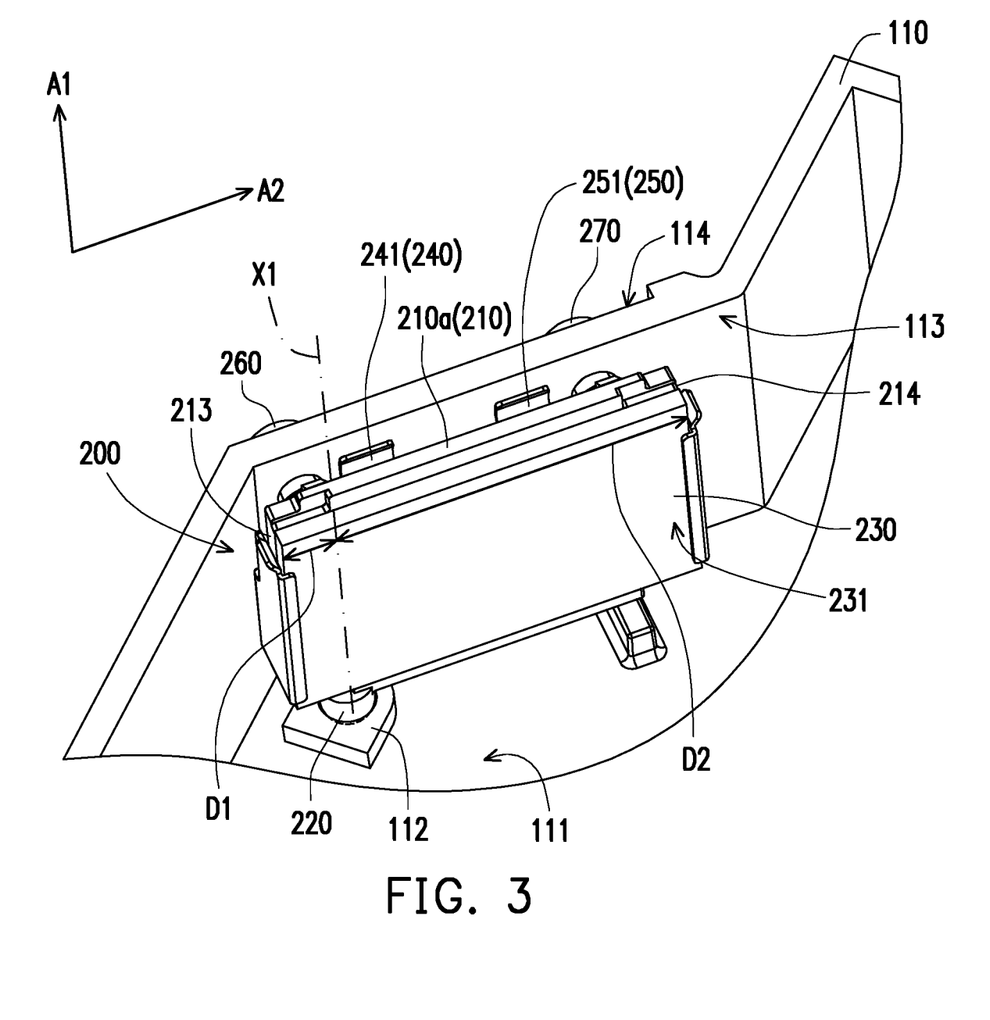
FIG. 3 and FIG. 4 are partially enlarged three-dimensional schematic diagrams of an adjusting structure of reflector and a housing of FIG. 1 at two different visual angles.
Figure 4:
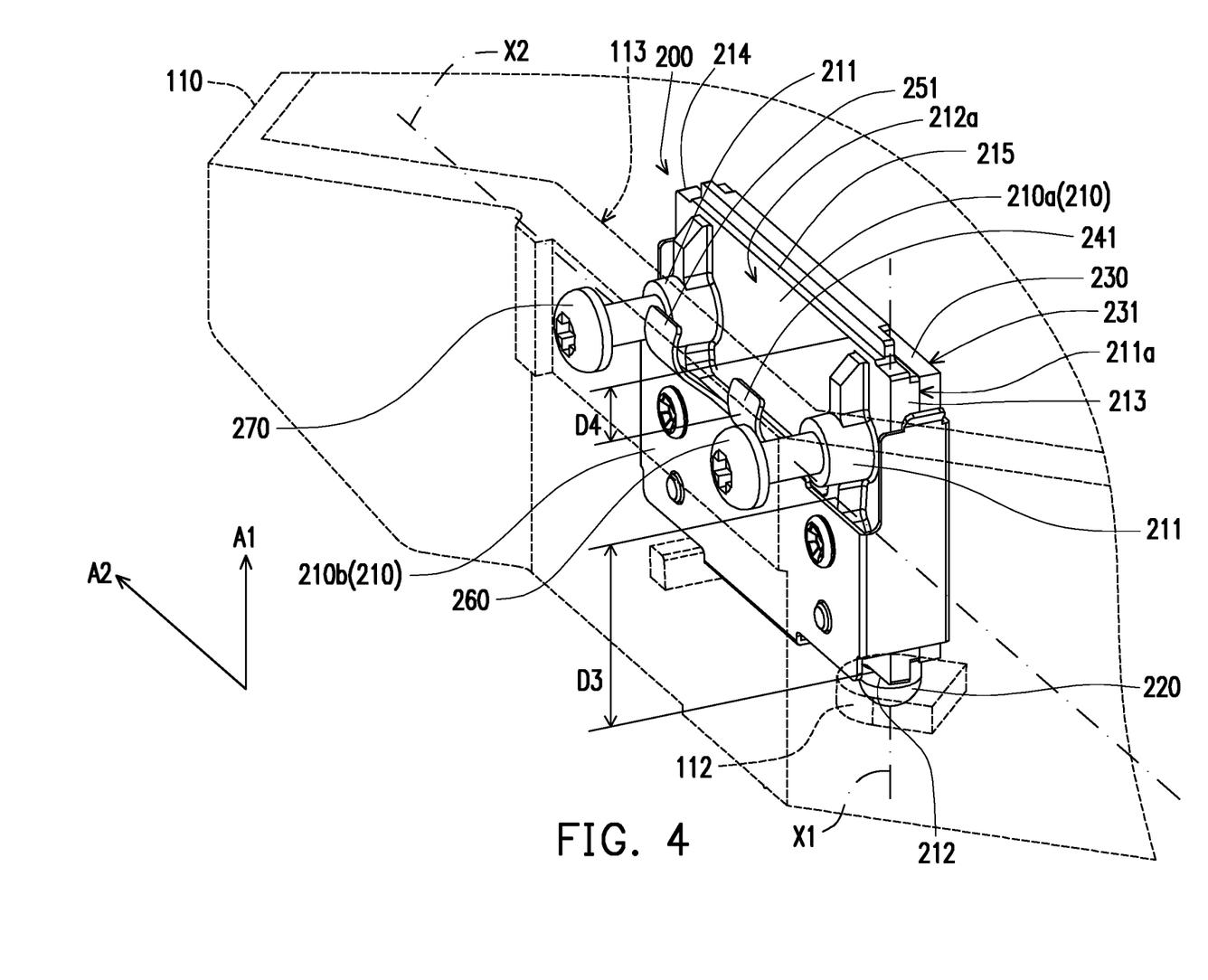

FIG. 1 is a top view schematic diagram of a projecting apparatus of one embodiment of the present invention. FIG. 2 is a partially enlarged schematic diagram of an area A of FIG. 1. FIG. 3 and FIG. 4 are partially enlarged three-dimensional schematic diagrams of an adjusting structure of reflector and a housing of FIG. 1 at two different visual angles. In particular, a housing 110 in FIG. 4 is illustrated in dotted lines, so as to clearly show the structure configuration of an adjusting structure of reflector 200 disposed in the housing 110. Referring to FIG. 1 to FIG. 4, in the present embodiment, the projecting apparatus 100 includes a housing 110, a light source module 120, an adjusting structure of reflector 200, an imaging module 130 and a projection lens module 140. The housing 110 is configured to accommodate the adjusting structure of reflector 200, the imaging module 130 and an optical component group (not shown). In order to prevent the adjusting structure of reflector 200, the imaging module 130 and the optical component group (not shown) from shifting caused by an external impact, or failure in function or damage caused by foreign matters or water vapour, a housing cover (not shown) is disposed above the housing 110. The housing cover is configured to cover the adjusting structure of reflector 200, the imaging module 130 and the optical component group (not shown) which are disposed in the housing 110.

The light source module 120 and the projection lens module 140 are respectively disposed at two opposite sides of the housing 110. The light source module 120 is configured to emit an illuminating beam I. The optical component group (not shown), the adjusting structure of reflector 200 and the imaging module 130 are disposed on a transmission path of the illuminating beam I. The adjusting structure of reflector 200 and the imaging module 130 are disposed between the light source module 120 and the projection lens module 140. Firstly, the illuminating beam I emitted by the light source module 120 may pass through the optical component group (not shown), so that actions such as light filtering, light composition, light splitting and adjustment of the transmission path are performed. Then, the illuminating beam I may pass through the optical component group (not shown) and is projected to the adjusting structure of reflector 200. A reflector 230 of the adjusting structure of reflector 200 is configured to deflect the illuminating beam I toward the imaging module 130. Finally, the imaging module 130 is configured to modulate the illuminating beam I into an image beam IM and emit the image beam IM to the projection lens module 140, and the image beam IM is received by the projection lens module 140 and is further emitted to the outside.

In order to adjust an angle or position of the illuminating beam I toward the imaging module 130, a structural design of the adjusting structure of reflector 200 is described at least as follows.

Referring to FIG. 1 to FIG. 4, in the present embodiment, the adjusting structure of reflector 200 includes a base 210, a pivoting component 220, a reflector 230, a first elastic component 240, a second elastic component 250 parallel to the first elastic component 240, a first adjusting screw 260 and a second adjusting screw 270. The first elastic component 240 and the second elastic component 250 may be integrally manufactured into a single elastic component. The two elastic parts are used as examples in the present embodiment and do not limit the present embodiment. In addition, the base 210 is provided with a pivoting component 220, and the base 210 is configured to hold the reflector 230, and the base 210 is pivoted to the housing 110 by using the pivoting component 220. Further, the pivoting component 220, for example, is a ball shaft, and is connected to one side edge of the base 210, so as to serve as a rotating supporting point for the base 210. It is worth mentioning that the pivoting component 220 is not disposed on a central axis of the base 210, and thus, a reflection direction and angle of the reflector 230 may be effectively adjusted. More detailed description is given in the following paragraphs. Moreover, a bottom surface 111 of the interior of the housing 110 is provided with a pivoting seat 112. The pivoting seat 112 may be a ball seat, and is configured to be matched with the ball shaft. With the coordination of the ball shaft and the ball seat, the base 210 and the reflector 230 disposed on the base 210 may have at least a freedom of motion rotating around a first axial direction A1 or a second axial direction A2 perpendicular to the first axial direction A1. In addition, in other embodiments, the base 210 and the reflector 230 disposed on the base 210 may simultaneously have freedoms of motion rotating around the first axial direction A1 and the second axial direction A2 perpendicular to the first axial direction A1. Thus, the better operation may be achieved.

The first elastic component 240 and the second elastic component 250 may be spring plates, and are configured to generate elastic force caused from a deformation when compressed externally. In addition, after the external force is removed, the first elastic component 240 and the second elastic component 250 may return to an original state (namely, a state before a compressive deformation). Alternatively, when the external force is decreased, a deformation is decreased, or when the external force is increased, the deformation is increased. The reflector 230 is disposed at one side, facing the light source module 120, of the base 210, and is configured to receive the illuminating beam I. The first elastic component 240 and the second elastic component 250 are connected to one side, opposite to the light source module 110, of the base. In other words, any of the first elastic component 240 and the second elastic component 250, and the reflector 230 are respectively located at two opposite sides of the base 210. Further, the first elastic component 240 and the second elastic component 250 are abut against a first side wall surface 113 inside the housing 110, and the degree of the deformation of the first elastic component 240 and the second elastic component 250 may be changed as the distance between the base 210 and the first side wall surface 113 changes. Although the present embodiment is illustrated by the pressure-deformed spring plates as examples, the present invention is not limited to this. In other embodiments, the foregoing two elastic parts may be extension springs or torsion springs, or may be elastomers capable of elastically deforming, such as rubber or silica gel.

The first adjusting screw 260 and the second adjusting screw 270 pass through a side wall 115 from a second side wall surface 114 outside the housing 110, and penetrate out of the first side wall surface 113 to extend into the interior of the housing 110, so as to be connected with the base 210. For example, two screw seats 211 are disposed at one side, facing the first side wall surface 113, of the base 210, so that part of the first adjusting screw 260 extending into the housing 110 and part of the second adjusting screw 270 extending into the housing 110 are threaded in the screw seats. Therefore, the first adjusting screw 260 and the second adjusting screw 270 not only may be used to limit the base 210 in the housing 110, but also may be used to adjust a distance between the base 210 and the first side wall surface 113. Further, the distance between the base 210 and the first side wall surface 113 may be changed as the depth of the first adjusting screw 260 or the second adjusting screw 270 being threaded into the corresponding screw seat 211 changes. In addition, corresponding to the changes in the depths of the first adjusting screw 260 and the second adjusting screw being threaded into the corresponding screw seats 211, the distance between the base 210 and the first side wall surface 113 may be changed into an asymmetric state.

Figure 5:
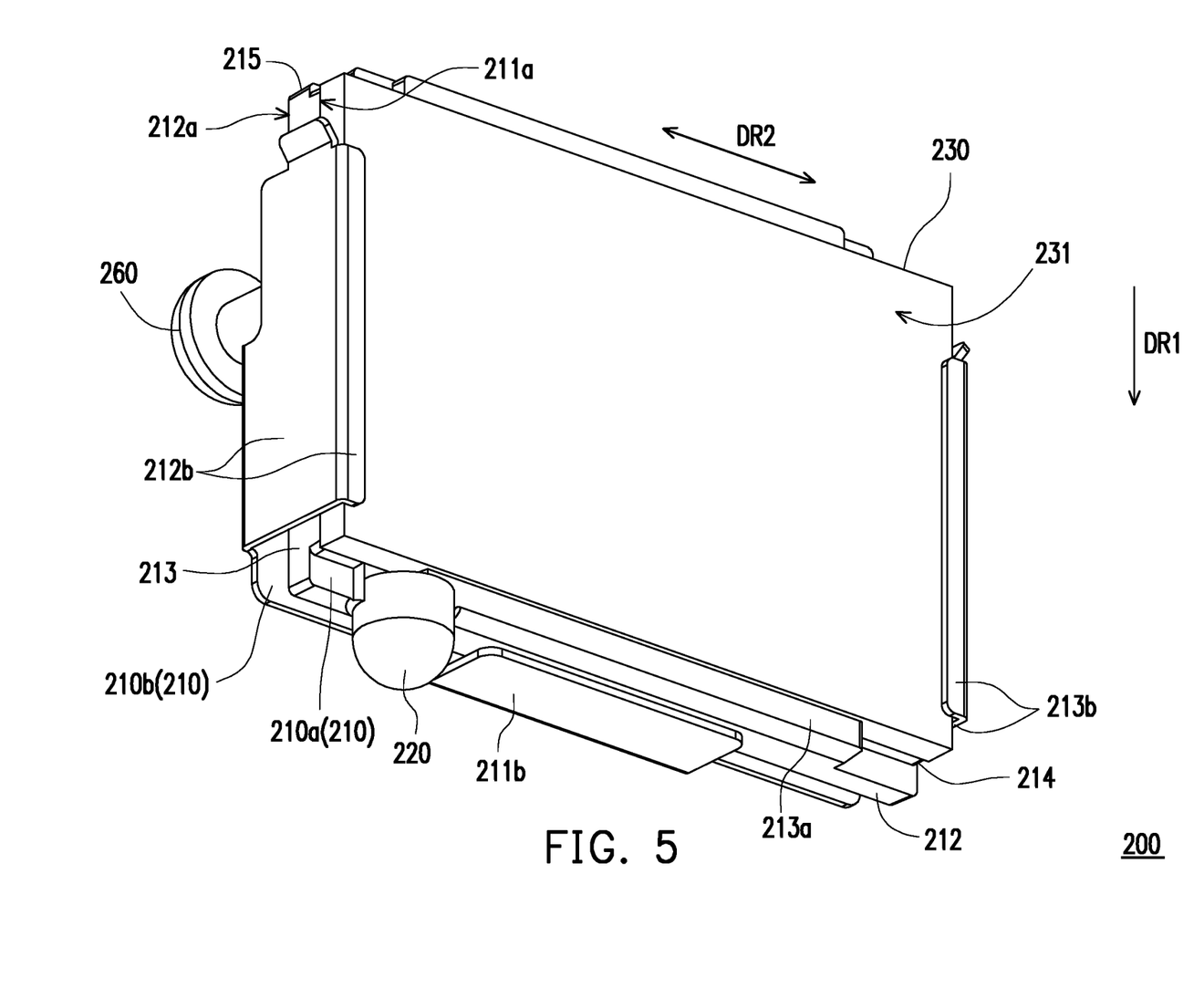
FIG. 5 is a three-dimensional schematic diagram of the adjusting structure of reflector of FIG. 1.

FIG. 5 is a three-dimensional schematic diagram of the adjusting structure of reflector of FIG. 1. Referring to FIG. 2 to FIG. 5 and FIG. 6, in the present embodiment, a first axis X1 is formed by the pivoting component 220 and the pivoting seat 112. The first adjusting screw 260 is disposed on the first axis X1. Specifically, an adjusting direction of the first adjusting screw 260 and the first axis X1 may intersect with each other, and the adjusting direction of the first adjusting screw 260 is perpendicular to the first axis X1. The base 210 is provided with a first side edge 212, a second side edge 213 and a third side edge 214. The second side edge 213 and the third side edge 214 are opposite to each other, and the first side edge 212 is connected to the second side edge 213 and the third side edge 214. The pivoting component 220 is connected to the first side edge 212 and is located between the second side edge 213 and the third side edge 214. A distance D1 between the pivoting component 220 and the second side edge 213 is less than a distance D2 between the pivoting component 220 and the third side edge 214. In the design that the rotating supporting point (namely, the pivoting component 220) of the base 210 being shifted from the central axis of the base 210, the flexibility when the base 210 rotates around the first axial direction A1 relative to the housing 110 may be improved. Further, the first elastic component 240, the second elastic component 250, the first adjusting screw 260 and the second adjusting screw 270 are located at the same side of the base 210, and the first adjusting screw 260 and the second adjusting screw 270 are respectively located at two opposite sides of the first elastic component 240 and the second elastic component 250. For example, the first adjusting screw 260 is relatively close to the second side edge 213, and the first adjusting screw 260 is located between the first elastic component 240 and the second side edge 213. The first elastic component 240 is located between the first adjusting screw 260 and the second elastic component 250. Compared with the second elastic component 250, the second adjusting screw 270 is closer to the third side edge 214, and the second adjusting screw 270 is located between the second elastic component 250 and the third side edge 214.

In one embodiment, the first adjusting screw 260 and the second adjusting screw 270 are located on a second axis X2. Further, adjusting directions of the first adjusting screw 260 and the second adjusting screw 270 may intersect with the second axis X2 respectively at one point. The first axis X1 and the second axis X2 may intersect with and be perpendicular to each other. Moreover, the first elastic component 240 includes a first abutting part 241, and the second elastic component 250 includes a second abutting part 251. The first abutting part 241 and the second abutting part 251 are configured to abut against the first side wall surface 113, and the first abutting part 241 and the second abutting part 251 are located on the second axis X2. The base 210 is also provided with a fourth side edge 215 which is opposite to the first side edge 212, and the fourth side edge 215 is connected to the second side edge 213 and the third side edge 214. The first abutting part 241 and the second abutting part 251 are located between the first side edge 212 and the fourth side edge 215, and the second axis X2, for example, is parallel to the first side edge 212 and the fourth side edge 215. Further, a distance D3 between either of the first abutting part 241 and the second abutting part 251 and the first side edge 212 is greater than a distance D4 between either of the first abutting part 241 and the second abutting part 251 and the fourth side edge 215.

In states shown in FIG. 2 to FIG. 4, based on the threading relationship between the first adjusting screw 260 and the corresponding screw seat 211, and based on the threading relationship between the second adjusting screw 270 and the corresponding screw seat 211, the first elastic component 240 and the second elastic component 250 are pressed between the first side wall surface 113 and the base 210 and may be deformed when compressed externally.

In a first operation mode, a user may adjust the depth of the second adjusting screw 270 threaded into the corresponding screw seat 211, and if the depth of the second adjusting screw 270 threaded into the corresponding screw seat 211 is decreased, the base 210 is driven to rotate around the first axial direction A1 relative to the housing 110 by using the pivoting component 220, thus causing the third side edge 214 of the base 210 to move and approach the first side wall surface 113. On the contrary, if the depth of the second adjusting screw 270 threaded into the corresponding screw seat 211 is increased, the base 210 is driven to rotate around the first axial direction A1 relative to the housing 110 by using the pivoting component 220, thus causing the third side edge 214 of the base 210 to move and get far away from the first side wall surface 113.

Based on the above, the first adjusting screw 260 is immobilized. The first adjusting screw 260 and the pivoting component 220 are located on the same axis, and the pivoting component 220 serves as the rotating supporting point of the base 210. Further, the second adjusting screw 270 located on the second axis X2 serves as a point of force application for driving the base 210 to rotate relative to the housing 110, and the second adjusting screw 270 is configured to be far away from the pivoting component 220. Based on a principle of moments, by rotatably adjusting the second adjusting screw 270, the base 210 may be driven to rotate around the first axial direction A1 relative to the housing 110, and thus the position of the reflector 230 rotating along with the base 210 is adjusted rapidly, stably and accurately, such that an angle or position of the illuminating beam I (shown in FIG. 1) deflected by the reflector 230 to be emitted toward the imaging module 130 (shown in FIG. 1) is changed accordingly. In particular, in the first operation mode, the first axial direction A1, for example, is parallel to the first axis X1. In addition, in other embodiments, and in the first operation mode, the user may adjust the depth of the second adjusting screw 270 threaded into the corresponding screw seat 211, so that the base 210 may be driven to rotate around the first axial direction A1 relative to the housing 110, and the base 210 may also be driven to rotate around the second axial direction A2 relative to the housing 110. Therefore, by adjusting the second adjusting screw 270, the base 210 may be driven to rotate in two dimensional directions.

In a second operation mode, the user may adjust the depth of the first adjusting screw 260 threaded in the corresponding screw seat 211. If the depth of the first adjusting screw 260 threaded into the corresponding screw seat 211 is decreased, the base 210 is driven to rotate around the second axial direction A2 relative to the housing 110 by using the pivoting component 220, thus causing the fourth side edge 215 to move and approach the first side wall surface 113. On the contrary, if the depth of the first adjusting screw 260 threaded into the corresponding screw seat 211 is increased, the base 210 is driven to rotate around the second axial direction A2 relative to the housing 110 by using the pivoting component 220, thus causing the fourth side edge 215 to move and get far away from the first side wall surface 113.

Referring to FIG. 2 to FIG. 5, in the present embodiment, the base 210 includes a first holding part 210a and a second holding part 210b. The first holding part 210a includes a pivoting component 220, the pivoting component 220 is connected to the first holding part 210a, and the first holding part 210a is provided with a first surface 211a and a second surface 212a opposite to each other. The reflector 230 abuts against the first surface 211a, and the first adjusting screw 260 and the second adjusting screw 270 are respectively connected to the two screw seats 211 located on the second surface 212a. The second holding part 210b faces the second surface 212a. The second holding part 210b covers a partial area of the second surface 212a, and exposes areas where the two screw seats 211 are located. Moreover, the second holding part 210b includes a first elastic component 240 and a second elastic component 250. The first elastic component 240 and the second elastic component 250 are connected to the second holding part 210b, and extend toward a direction far away from the pivoting component 220.

The second holding part 210b is provided with a first limiting portion 211b, a second limiting portion 212b and a third limiting portion 213b. The first limiting portion 211b is substantially perpendicular to the second limiting portion 212b and the third limiting portion 213b, and the second limiting portion 212b and the third limiting portion 213b are respectively located at two opposite sides of the first limiting portion 211b. As shown in FIG. 5, the first limiting portion 211b, the second limiting portion 212b and the third limiting portion 213b constitute a space for accommodating the first holding part 210a and the reflector 230, so as to facilitate the disassembly and assembly of the first holding part 210a and the reflector 230. The first holding part 210a is provided with a holding g portion 213a protruding out of the first surface 211. After the first holding part 210a is assembled to a fixed position, part of the holding portion 213a of the first holding part 210a abuts against the first limiting portion 211b so as to limit the degree of freedom of movement of the first holding part 210a in a first direction DR1. Meanwhile, the second limiting portion 212b and the third limiting portion 213b are configured to limit the degree of freedom of movement of the first holding part 210a in a second direction DR2 perpendicular to the first direction DR1.

Based on the above, the first limiting portion 211b abuts against the first side edge 212 of the first holding part 210a, and the second limiting portion 212b and the third limiting portion 213b respectively extent to pass over the second side edge 213 and the third side edge 214 of the first holding part 210a. After the reflector 230 is assembled to the fixed position, the reflector 230 abuts against the holding portion 213a so as to limit the degree of freedom of movement of the reflector 230 in the first direction DR1. Meanwhile, the second limiting portion 212b and the third limiting portion 213b are configured to limit the degree of freedom of movement of the reflector 230 in the second direction DR2. In the present embodiment, the reflector 230 is provided with a reflecting surface 231 opposite to the first surface 211a. The second limiting portion 212b extends to pass over one side of the reflector 230 and is buckled against the reflecting surface 231, and the third limiting portion 213b extends to pass over the other side of the reflector 230 and is buckled against the reflecting surface 231, thus firmly fixing the reflector 230 on the base 210.

Figure 6:
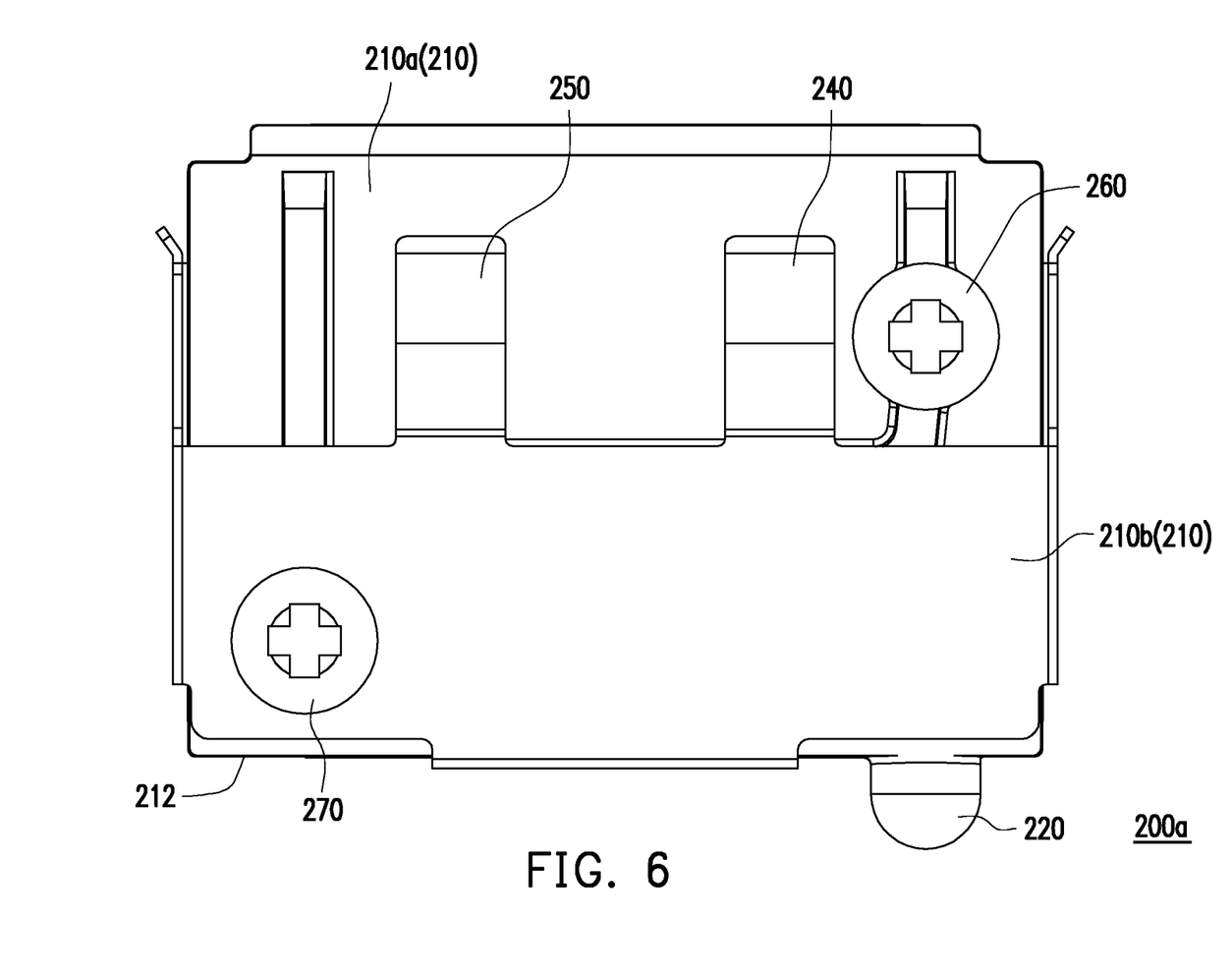
FIG. 6 is a rear view schematic diagram of an adjusting structure of reflector of another embodiment of the invention.

FIG. 6 is a rear view schematic diagram of an adjusting structure of reflector of another embodiment of the invention. Referring to FIG. 6, the adjusting structure of reflector 200a of the embodiment is similar to the adjusting structure of reflector 200 of the above embodiment in general. The main difference between the present embodiment and the above embodiment lies in that: in the present embodiment, the first adjusting screw 260, the first elastic component 240 and the second elastic component 250 are located on the same axis (X2), referring to FIG. 4. The second adjusting screw 270 and the first adjusting screw 260 are not located on the same axis (X2). The second adjusting screw 270 is closer to the first side edge 212 of the base 210 than the first adjusting screw 260.

In particular, in other embodiments, the first elastic component and the second elastic component may be located on the same axis, and the first adjusting screw and the second adjusting screw may be located on the same axis, but either of the first elastic component and the second elastic component and either of the first adjusting screw and the second adjusting screw are not located on the same axis. Alternatively, the first elastic component and the first adjusting screw may be located on the same axis, and the second elastic component and the second adjusting screw may be located on the same axis. However, either of the first elastic component and the first adjusting screw and either of the second elastic component and the second adjusting screw are not located on the same axis. Alternatively, the first elastic component and the second adjusting screw may be located on the same axis, and the second elastic component and the first adjusting screw may be located on the same axis. However, either of the first elastic component and the second adjusting screw and either of the second elastic component and the first adjusting screw are not located on the same axis. Alternatively, the second adjusting screw, the first adjusting screw, the first elastic component and the second elastic component are not completely located on the same axis.

Based on the above, the embodiments of the present invention may achieve at least one of the following advantages or effects. In the embodiments of the present invention, the base is limited in the housing by the two adjusting screws. By rotatably adjusting either of the two adjusting screws, the base and the reflector on the base may be driven to rotate around two different axial directions relative to the housing with respect to the rotating supporting point (namely, the pivoting component). With the adjustment of the position of the reflector, the angle or position of the illuminating beam deflected by the reflector to be emitted toward the imaging module is also changed accordingly. In the process of adjusting the position of the reflector, the two adjusting screws do not need to be removed, and once the rotatable adjustment of the two adjusting screws is stopped, the positions of the base and the reflector on the base are fixed accordingly. Moreover, the two elastic parts and the two adjusting screws are disposed at the same side of the base, and the two elastic parts are configured to abut against the housing, thus improving of stability of the base and the reflector on the base relative to the housing during the process of rotation. As a result, the rotation process of the base and the reflector on the base relative to the housing may also be more smoothly to be rotated. In general, the coordination of the two adjusting screws and the two elastic parts not only can cause the adjustment process of the positions of the base and the reflector on the base to be more simple and more time-saving, but also can achieve good adjustment stability and accuracy.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjusting structure of reflector, comprising:
 a base;
 a pivoting component, connected to the base, wherein the base is pivoted to a housing by using the pivoting component, and has freedoms of motion rotating around a first axial direction and a second axial direction perpendicular to the first axial direction;
 a reflector, disposed on the base;
 a first adjusting screw, configured to be penetrated the housing and connected to the base, wherein an adjusting direction of the first adjusting screw and the first axial direction intersect with each other; and
a second adjusting screw, configured to be penetrated the housing and connected to the base, wherein the first adjusting screw and the second adjusting screw are located at the same side of the base.

2. The adjusting structure of reflector of claim 1, wherein the base comprises two opposite side edges, and the pivoting component is located between the two side edges, wherein a distance between the pivoting component and one of the two side edges is less than a distance between the pivoting component and the other one of the two side edges.

3. The adjusting structure of reflector of claim 1, wherein the adjusting direction of the first adjusting screw and an adjusting direction of the second adjusting screw intersect with the second axis respectively at one point, and the first axis and the second axis are perpendicular to each other.

4. The adjusting structure of reflector of claim 1, further comprising at least one elastic component connected to the base, wherein the at least one elastic component and the reflector are respectively located at two opposite sides of the base, the at least one elastic component abuts against the housing, and the first adjusting screw and the second adjusting screw are respectively located at two opposite sides of the at least one elastic component.

5. The adjusting structure of reflector of claim 4, wherein the least one elastic component respectively comprises an abutting part configured to abut against the housing, wherein the first adjusting screw and the abutting part are located on a second axis.

6. The adjusting structure of reflector of claim 4, wherein the base comprises two opposite side edges, and the at least one elastic component respectively comprises an abutting part configured to abut against the housing, wherein the pivoting component is connected to one of the two side edges, and a distance between the abutting part and one of the two side edges is greater than a distance between the abutting part and the other one of the two side edges.

7. The adjusting structure of reflector of claim 4, wherein the base comprises:
a first holding part, wherein the pivoting component is connected to the first holding part, the first holding part comprises a first surface and a second surface opposite to each other, the reflector abuts against the first surface, and the first adjusting screw and the second adjusting screw are connected to the second surface; and
a second holding part, fixed on the second surface, wherein the least one elastic component is connected to the second holding part.

8. The adjusting structure of reflector of claim 7, wherein the first holding part comprises a holding portion protruding out of the first surface, and the reflector abuts against the holding portion.

9. The adjusting structure of reflector of claim 7, wherein the second holding part is provided with a first limiting portion, a second limiting portion and a third limiting portion, the second limiting portion and the third limiting portion are respectively located at two opposite sides of the first limiting portion, the first limiting portion abuts against a first side edge of the first holding part, and the second limiting portion and the third limiting portion respectively extend to pass over a second side edge and a third side edge of the first holding part.

10. The adjusting structure of reflector of claim 9, wherein the reflector comprises a reflecting surface opposite to the first surface, wherein the second limiting portion extends to pass over one side of the reflector and is buckled against the reflecting surface, and the third limiting portion extends to pass over the other side of the reflector and is buckled against the reflecting surface.

11. The adjusting structure of reflector of claim 4, wherein the least one elastic component comprises two parallel elastic parts connected to the base, wherein the two elastic parts and the reflector are respectively located at the two opposite sides of the base.

12. A projecting apparatus, comprising: a housing, a light source module, a reflector adjusting structure, an imaging module and a projection lens module,
wherein the light source module is disposed on the housing, and is configured to emit an illuminating beam;
the adjusting structure of reflector is disposed on the housing, wherein the adjusting structure of reflector comprises a base, a pivoting component, a reflector, a first adjusting screw and a second adjusting screw, wherein
the pivoting component is connected to the base, and the base is pivoted to the housing by using the pivoting component, and has freedoms of motion rotating around a first axial direction and a second axial direction perpendicular to the first axial direction;
the reflector is disposed on the base and located on a transmission path of the illuminating beam, and is configured to deflect the illuminating beam;
the first adjusting screw is configured to be penetrated the housing and connected to the base, and an adjusting direction of the first adjusting screw and the first axial direction intersect with each other; and
the second adjusting screw is configured to be penetrated the housing and connected to the base, and the first adjusting screw and the second adjusting screw are located at the same side of the base;
the imaging module is disposed in the housing, and is configured to modulate the illuminating beam deflected by the reflector into an image beam; and
the projection lens module is disposed on the housing, and is configured to receive and projecting the image beam.

13. The projecting apparatus of claim 12, wherein the base comprises two opposite side edges, and the pivoting component is located between the two side edges, wherein a distance between the pivoting component and one of the two side edges is less than a distance between the pivoting component and the other one of the two side edges.

14. The projecting apparatus of claim 12, wherein the adjusting direction of the first adjusting screw and an adjusting direction of the second adjusting screw intersect with the second axis respectively at one point, and the first axis and the second axis are perpendicular to each other.

15. The projecting apparatus of claim 12, wherein the projecting apparatus also comprises at least one elastic component connected to the base, wherein the at least one elastic component and the reflector are respectively located at two opposite sides of the base, the at least one elastic component abuts against the housing, and the first adjusting screw and the second adjusting screw are respectively located at two opposite sides of the at least one elastic component.

16. The projecting apparatus of claim 15, wherein the at least one elastic component respectively comprises an abutting part configured to abut against the housing, wherein the first adjusting screw and the abutting part are located on a second axis.

17. The projecting apparatus of claim 15, wherein the base comprises two opposite side edges, and the at least one elastic component respectively comprises an abutting part configured to abut against the housing, wherein the pivoting component is connected to one of the two side edges, and a distance between the abutting part and one of the two side edges is greater than a distance between the abutting part and the other one of the two side edges.

18. The projecting apparatus of claim 15, wherein the base comprises:
   a first holding part, wherein the pivoting component is connected to the first holding part, the first holding part comprises a first surface and a second surface opposite to each other, the reflector abuts against the first surface, and the first adjusting screw and the second adjusting screw are connected to the second surface; and
   a second holding part, fixed on the second surface, wherein the least one elastic component is connected to the second holding part.

19. The projecting apparatus of claim 18, wherein the first holding part comprises a holding portion, protruding out of the first surface, and the reflector abuts against the holding portion.

20. The projecting apparatus of claim 18, wherein the second holding part is provided with a first limiting portion, a second limiting portion and a third limiting portion, the second limiting portion and the third limiting portion are respectively located at two opposite sides of the first limiting portion, the first limiting portion abuts against a first side edge of the first holding part, and the second limiting portion and the third limiting portion respectively extend to pass over a second side edge and a third side edge of the first holding part.

21. The projecting apparatus of claim 20, wherein the reflector comprises a reflecting surface opposite to the first surface, wherein the second limiting portion extends to pass over one side of the reflector and is buckled against the reflecting surface, and the third limiting portion extends to pass over the other side of the reflector and is buckled against the reflecting surface.

22. The projecting apparatus of claim 15, wherein the at least one elastic component comprises two parallel elastic parts connected to the base, wherein the at least one elastic component and the reflector are respectively located at the two opposite sides of the base.

* * * * *